(12) United States Patent
Carlsson et al.

(10) Patent No.: US 6,395,171 B1
(45) Date of Patent: May 28, 2002

(54) STRAINER ARRANGEMENT FOR STRAINING LIQUID FROM A MIXING ARRANGEMENT

(75) Inventors: Gustav Carlsson, Göthenburg; Tommy Eriksson, Nol; Christer Isaksson, Kullavik; Sven-Erik Jansson, Göthenburg; Lennart Lindau, Mölndal; Bengt Nyman, Torslanda; Lars Olausson, Angered; Hans Sjöberg, Billdal; Jan Bergman, Mölnlycke, all of (SE)

(73) Assignee: Kvaerner Pulping AB (SE)

( * ) Notice: Subject to any disclaimer, the term of this patent is extended or adjusted under 35 U.S.C. 154(b) by 0 days.

(21) Appl. No.: 09/341,392

(22) PCT Filed: Jan. 16, 1998

(86) PCT No.: PCT/SE98/00064
§ 371 (c)(1),
(2), (4) Date: Jul. 7, 1999

(87) PCT Pub. No.: WO98/36999
PCT Pub. Date: Jan. 16, 1998

(30) Foreign Application Priority Data

Jan. 17, 1997 (SE) .............................................. 9700113

(51) Int. Cl.$^7$ .............................................. B01D 35/28
(52) U.S. Cl. ..................................... 210/251; 210/413
(58) Field of Search ................................. 210/251, 413

(56) References Cited

U.S. PATENT DOCUMENTS 5,569,383 A * 10/1996 Vander Ark, Jr. et al. .. 210/413
6,030,113 A * 2/2000 Bergman et al. ............. 422/227

* cited by examiner

Primary Examiner—Ivars Cintins
(74) Attorney, Agent, or Firm—Fasth Law Offices; Rolf Fasth

(57) ABSTRACT

The strainer arrangement is adapted for straining a liquid from a mixing arrangement, such as a mixing tank, containing black liquor including solid particles of ash. The strainer arrangement comprises a strainer pipe with axial gaps defined therein for permitting a radial inflow of liquid into the strainer pipe. An axially movable shaft is disposed inside the strainer pipe and has cleaning pins attached thereto that extend into the gaps.

15 Claims, 5 Drawing Sheets

STRAINER ARRANGEMENT FOR STRAINING LIQUID FROM A MIXING ARRANGEMENT

TECHNICAL FIELD

The invention relates to a strainer arrangement for straining liquid from a mixing arrangement, such as a mixing tank, for black liquor containing solid particles of ash. The ash in the black liquor is formed during combustion of black liquor and is separated from the flue gases and is mixed with new black liquor for introduction into the combustion installation which usually consists of a recovery boiler. For re-introducing the ash into the recovery boiler, it is important that the ash is thoroughly mixed with the black liquor which is to be combusted and that larger particles of ash, which may obstruct the nozzles for injecting the black liquor into the recovery boiler, are strained off using a suitable arrangement, and the invention relates to such a strainer arrangement.

BACKGROUND AND SUMMARY OF THE INVENTION

Mixing ash separated from the flue gases with black liquor which is to be combusted in a recovery boiler is a well-known technique which has been practised for many decades. Various installations for performing such mixing have been designed over the years. Such mixing arrangements are called mixing tanks and usually consist of a vessel with agitator(s), provided with liquor inlet(s), liquor outlet (s), ventilating pipe(s), ash inlet(s) and in most cases a heating arrangement. As agitators, use has as a rule been made of slow-moving agitators with arms which sweep along the perimeter of the mixing tank and create no more turbulence than allows larger particles to settle to the bottom zone. The lowest arms of the agitator are therefore made in the form of a scraping unit which works close to the bottom and performs mechanical treatment there of the settled material which is crushed into smaller particles which can gradually rise up to a higher level in the tank and pass out through the outlet.

In order that the liquor distribution in the combustion chamber takes place in a trouble-free manner, the injected liquor must not contain particles which are too large because these may block the injection nozzles. The liquor is therefore usually strained through a fixed strainer known as a perforated plate which is placed in front of the outlet of the mixing tank.

One example of a modern embodiment of a mixing tank is described in Swedish Patent 9600100-3. Good mixing is achieved in this mixing tank with the aid of baffles on the agitator and stationary baffles on the bottom of the tank. Via openings located vertically one above another and provided with a strainer plate on the outside, the mixed liquid can flow into a vertically positioned container of semi-circular section on the outside of the tank, from where the liquid is pumped onward.

The strainer plate, which constitutes a part of the outside of the tank and is lowered into vertical holders and which covers a large number of outlet openings, strains off larger particles and functions well as long as the strainer plate has not been obstructed. From time to time, however, it has to be cleaned and this can be done by lifting it up and subjecting it to cleaning outside the mixer or by liquid being allowed to flow in counter-current or by other means. However, this is a complicated procedure which disrupts production. For this reason, it has long been desirable to be able to produce a strainer arrangement which is cleaned automatically and without interrupting operation.

According to-the present invention, a strainer arrangement for straining liquid from a mixing arrangement, e.g. a mixing tank, for black liquor containing solid particles of ash has been produced, which strainer arrangement is characterized in that it comprises a strainer pipe with gaps for radial inflow into the strainer pipe of liquid, and also movable cleaning pins in the gaps.

According to the invention, it is expedient that the gaps extend axially, preferably vertically, and that the cleaning pins are mounted on an axially movable shaft in the strainer pipe.

According to the invention, the cleaning pins may be mounted on the shaft via rotatably suspended holders resembling wheels.

According to the invention, the cleaning pins may have a round or angular cross-section.

According to the invention, the gaps should be distributed uniformly around the perimeter of the pipe and expediently total twenty-four in number.

According to the invention, the gaps expediently have a length of roughly 500 mm and/or a width of roughly 8 mm and are preferably arranged in a number of groups, expediently four groups, one above another.

According to the invention, the movements of the shaft can be brought about with the aid of an electric motor or pneumatically or hydraulically.

According to the invention, in order to bring about the vertical movements, an extension shaft coupled to the uppermost part of the shaft is provided with trapezoidal threads to make worm-gear driving possible.

According to the invention, a seal is expediently arranged around the shaft at the upper end of the strainer pipe.

According to the invention, the strainer pipe may be arranged in a vertical space on the outside of the tank wall, freestanding from the mixing tank or inside the latter, or it may consist of a strainer plate on the tank wall.

BRIEF DESCRIPTION OF THE FIGURES

The invention will be described in greater detail below with reference to the attached drawings, in which.

DETAILED DESCRIPTION

Figure 1:
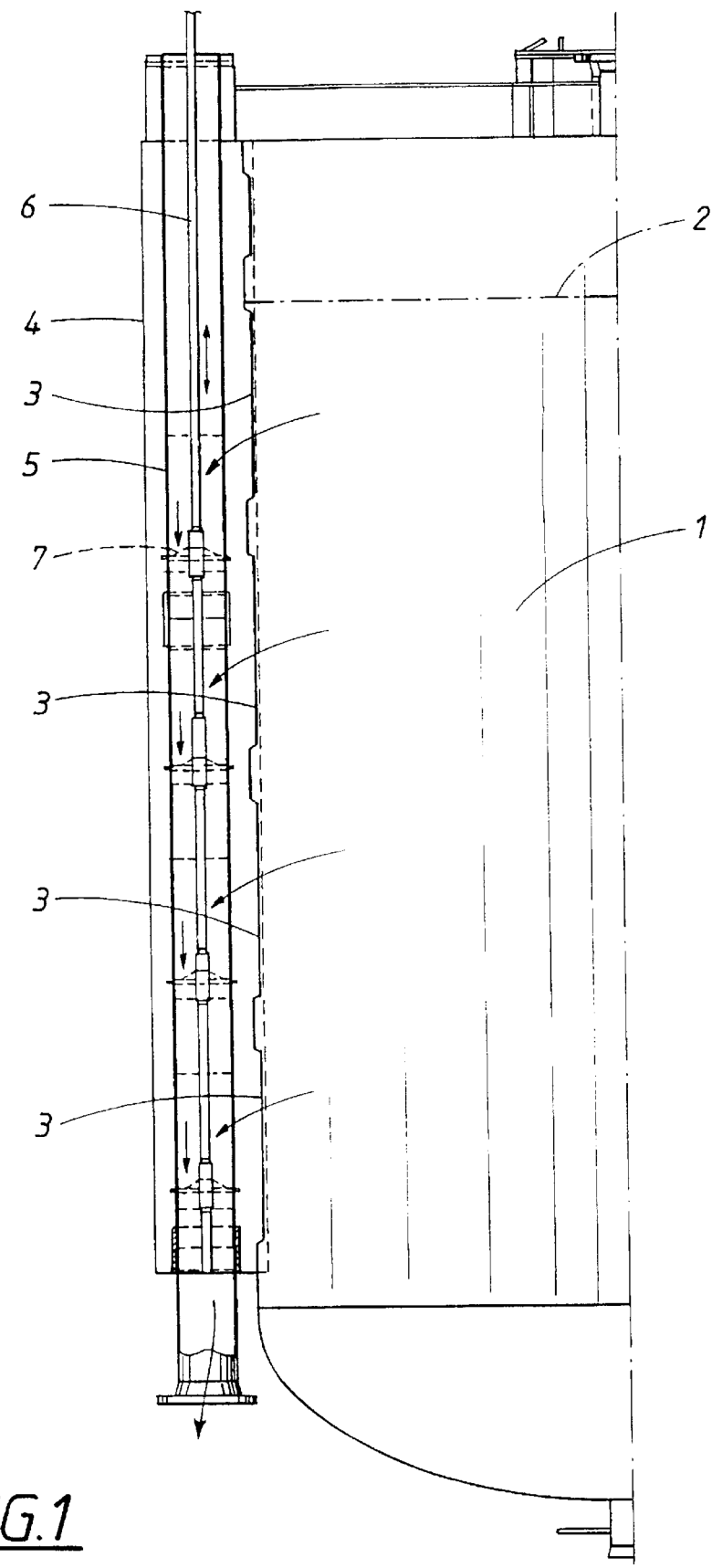
FIG. 1 shows a vertical section through the strainer arrangement according to the invention.

FIG. 1 shows a mixing tank or mixer 1 in vertical section. The tank is usually filled with liquid to the level 2. Filling is carried out continuously but, for the sake of simplicity, the arrangements for filling have been omitted. The vertical section has been made through the row of outlet openings 3 which are formed in the casing wall of the container 1 and which are located in a row one above another and number four in the drawing.

Located outside the outlet openings 3 is a vertically positioned outlet container of almost semi-circular cross-section, which delimits the outlet openings 3.

Liquid thus flows into this container 4 and passes out from it in the bottom part with the aid of a pipe fitted on and a pump arrangement which, however, are not shown. According to the invention, a strainer pipe 5 with longitudinal vertical slits has been arranged inside this outlet container 4. Additionally, a shaft 6 which can move up and down vertically has been arranged in this strainer pipe 5. Arranged on this shaft are cleaning pins 7 which protrude through the gaps in the strainer pipe 5. This is shown in greater detail in conjunction with FIGS. 3 and 4.

Figure 2:
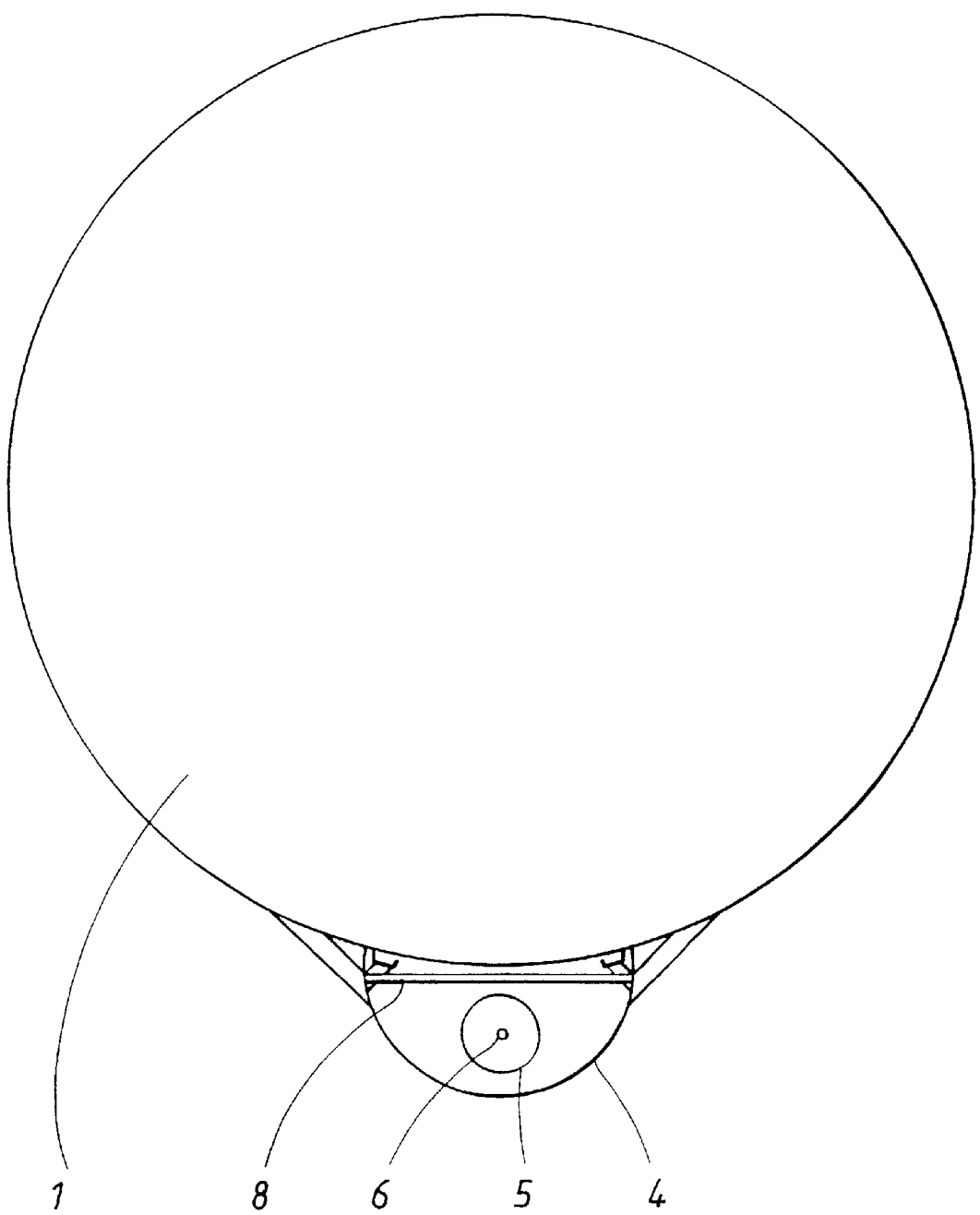
FIG. 2 shows a horizontal section through the same arrangement.

FIG. 2 shows a horizontal section through the tank according to FIG. 1. The same reference numbers as those in FIG. 1 apply for this figure also. Also shown is a reinforcing stay 8 which is arranged at appropriate places and is necessary in order to provide the construction with stability.

Figure 3:
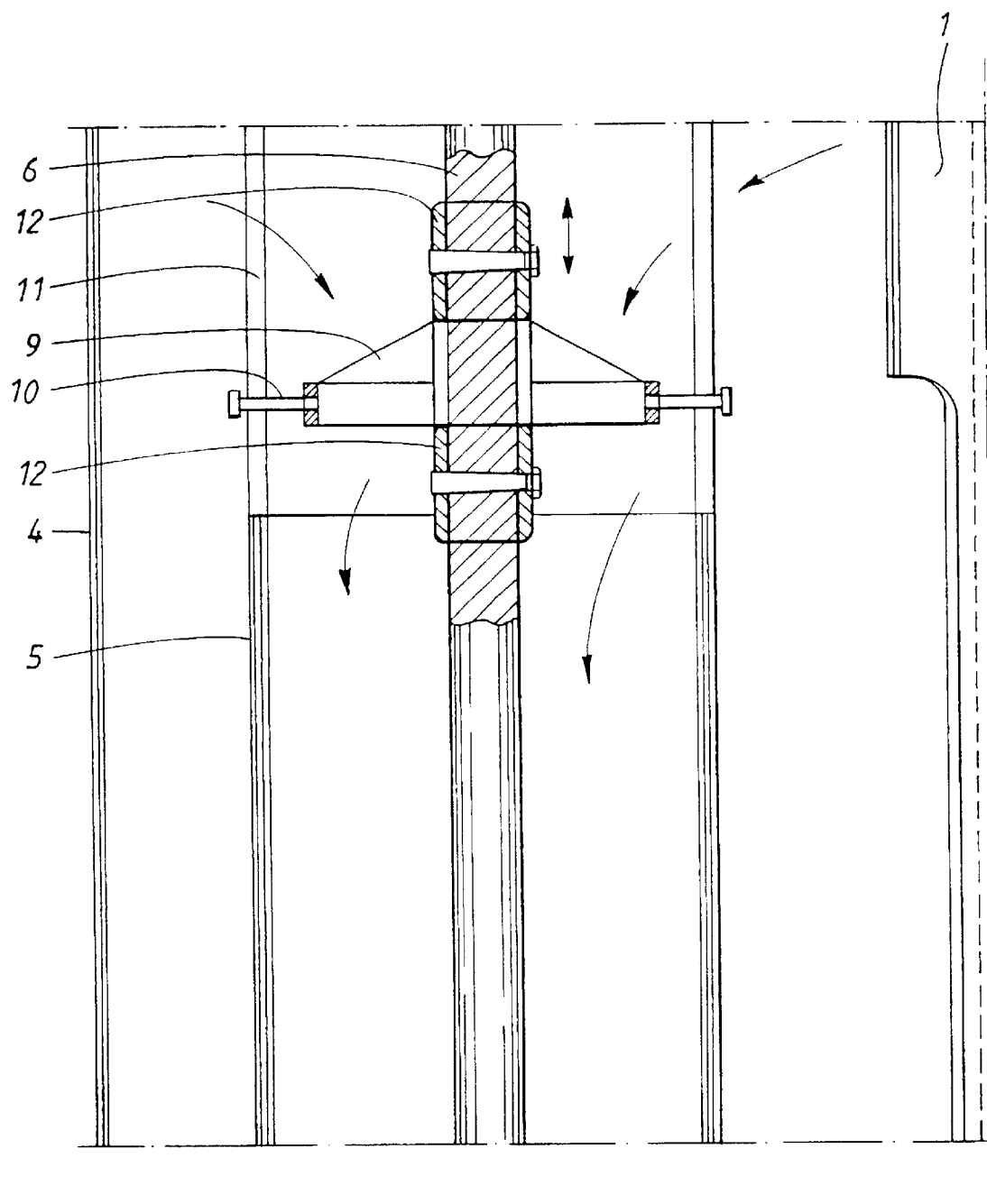
FIG. 3 shows in greater detail the shaft with cleaning pins which protrude through the gaps in the strainer pipe.

FIG. 3 shows a detailed view of the cleaning arrangement according to the invention. Inside the strainer pipe 5, the vertically movable shaft 6 is indicated, on which a holder 9 which bears the cleaning pins 10 is fastened. The cleaning pins 10 run in slits or gaps 11 in the strainer pipe 5. The holder 9, which resembles a wheel, is clamped with a given clearance fit between two brackets 12 which are in turn screwed tight on the shaft 6 with the aid of conical bolts. The cleaning pins 10 are screwed tight in the holder 9. These pins 10 must be mounted after the shaft 6 with the associated holders 9 has been guided into the strainer pipe 5.

These cleaning pins 10 are expediently of circular cross-section. They may, however, also be of angular cross-section, e.g. rectangular or triangular, because they can then function as a knife when they are guided up and down in the strainer pipe 5.

Figure 4:
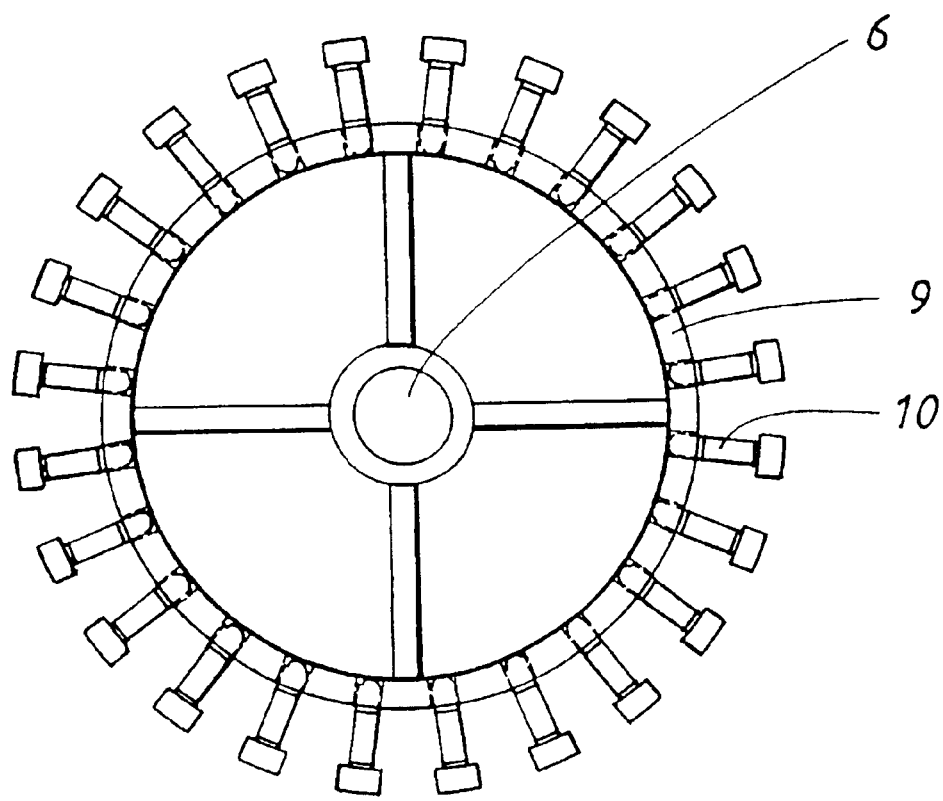
FIG. 4 shows a horizontal section of the shaft with cleaning pins fitted on, and FIG. 5 shows the upper part of the arrangement where driving of the vertical shaft takes place with the aid of an electric motor.

FIG. 4 shows a horizontal section through the shaft 6 with holder 9 fitted on, into which cleaning pins 10 have been screwed. These cleaning pins 10 number twenty-four in the present case.

They preferably have a diameter of roughly 8 mm and they are guided up and down in the gaps 11 with a stroke of expediently 0.5 m. If the cleaning pins 10 are of angular cross-section, a slightly larger gap opening is required at one end of the gaps so that the pins can be screwed in despite the non-round shape. The holder 9 has been arranged on the shaft 6 with given clearance so that it can be rotated to a certain extent around the shaft. This is to facilitate mounting of the cleaning pins 10.

Figure 5:
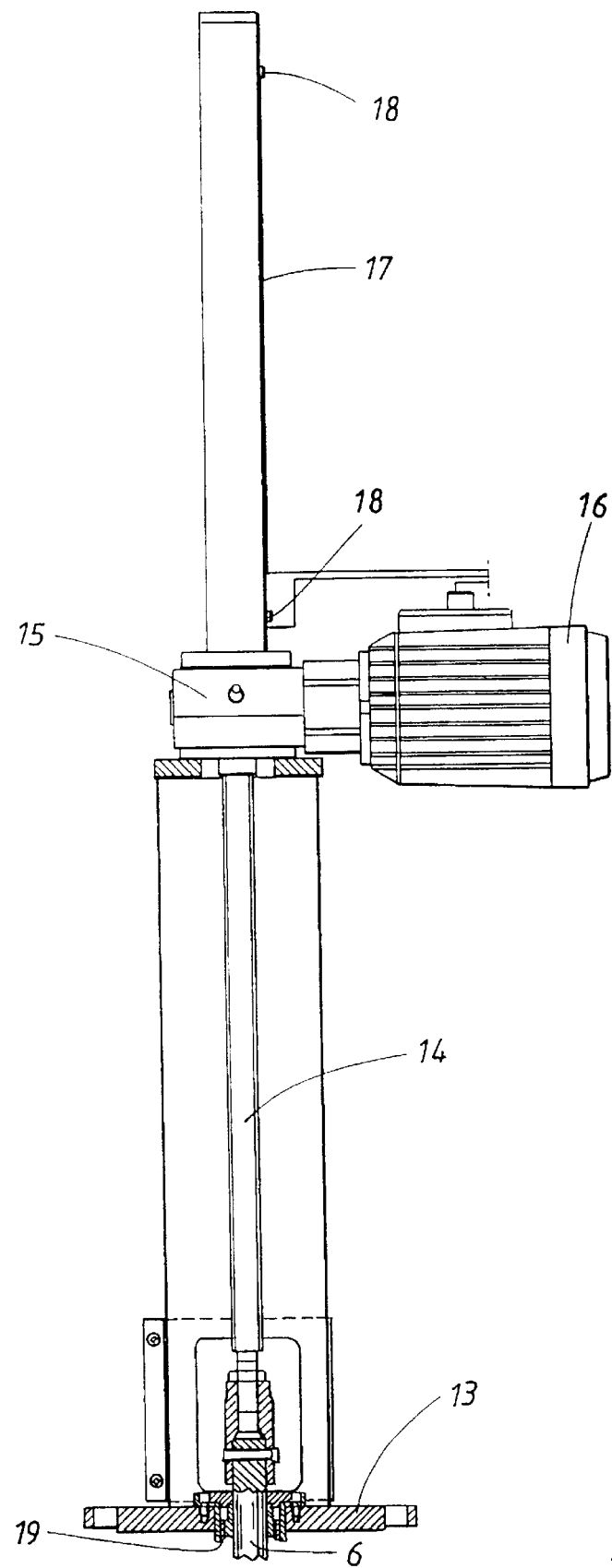

FIG. 5 shows partly in section the driving arrangement for the upward and downward movement of the shaft 6. This shaft 6 is guided out through a flange 13 and is coupled together with an extension shaft 14 with trapezoidal threads. This shaft extension 14 constitutes a part of a worm gear 15 which is driven by an electric motor 16. Above the worm gear 15, the shaft extension 14 moves in a tube 17. Arranged on or in this tube 17 are upper and lower indicators 18 which show the upper and lower position of the shaft extension 14 and with this also the upper and lower positions of the cleaning pins 10. Arranged in the flange 13 through which the shaft 6 extends is a rubber seal 19 to prevent corrosive liquor entering the space above the flange 13 and causing damage. FIG. 5 shows the lower position of the shaft 6. In the upper position, the shaft 6 thus extends all the way up to close to the worm gear 15.

Instead of an electric motor 16, a hydraulic or pneumatic driving arrangement can be installed. Driving takes place automatically, the stroke is defined by the indicators 18 and the interval between the upward and downward movements is set with the aid of a control unit. After movements have been performed, it is expedient that the shaft remains in the upper position which is a rest position. This is indicated by the upper sensor 18 being lit up.

The time taken for a stroke movement is usually roughly 45 seconds. The appropriate rest time depends on the composition of the liquor and can be determined only after a test operation period.

The strainer pipe and the cleaning pins are preferably made of stainless steel.

The invention has been described in connection with a complete strainer pipe 5 but, according to the invention, this may also consist of a strainer plate which is mounted in a similar manner as in the prior art but which has vertical gaps for the cleaning pins 10. This strainer plate thus constitutes a part of a pipe. It is not necessary either, although desirable, that the cleaning pins 10 are located around the entire circumference. If the strainer pipe 5 consists of only a part of a pipe, it is of course sufficient for the cleaning pins 10 to be limited to a number which corresponds to the gaps in the strainer pipe.

With the strainer pipe and the cleaning pins according to the present invention, any larger particles which do not go in through the gaps 11 are crushed. These particles may also consist of a relatively sticky substance which easily becomes stuck in narrow passages. These too are scraped away by the cleaning pins 10 and will be present in such a finely divided state that the injection nozzles which follow are not obstructed.

The invention is not restricted to the embodiments shown but can be modified in various ways within the scope of the patent claims. For example, the gaps 11 may extend otherwise than purely vertically, e.g. helically. Arranging purely horizontal gaps is another alternative, the shaft 6 then being rotated to and fro in order to move the cleaning pins 10 in the gaps 11.

While the present invention has been described in accordance with preferred compositions and embodiments, it is to be understood that certain substitutions and alterations may be made thereto without departing from the spirit and scope of the following claims.

We claim:

1. A strainer arrangement for straining a liquid from a mixing arrangement for black liquor containing solid particles of ash, comprising:

a strainer pipe having axially extending gaps defined therein for permitting a radial inflow of liquid into the strainer pipe;

an axially movable shaft disposed in the strainer pipe; and cleaning pins mounted on the shaft, the cleaning pins extending into the axially extending gaps, the mixing arrangement being in fluid communication with the strainer arrangement.

2. The strainer arrangement of claim 1 wherein the mixing arrangement is a mixing tank.

3. The strainer arrangement of claim 2 wherein the strainer pipe is disposed in a vertical space that is defined within an outside segment of a tank wall that is free standing from the mixing tank.

4. The strainer arrangement of claim 2 wherein the strainer pipe is disposed inside the mixing tank.

5. The strainer arrangement of claim 1 wherein the cleaning pins are mounted on the axially movable shaft via a rotatably suspended holder.

6. The strainer arrangement of claim 1 wherein the cleaning pins have a round cross-section.

7. The strainer arrangement of claim 1 wherein the cleaning pins have an angular cross-section.

8. The strainer arrangement of claim 1 wherein the gaps are uniformly distributed around a perimeter of the strainer pipe.

9. The strainer arrangement of claim 1 wherein the gaps have a length of about 500 millimeter and a width of about 8 millimeters and the gaps are disposed in a number of groups so that one group is above another group.

10. The strainer arrangement of claim 1 wherein an electric motor is in operative engagement with the axially movable shaft to move the axially movable shaft.

11. The strainer arrangement of claim 1 wherein a pneumatical device is in operative engagement with the axially movable shaft to move the axially movable shaft.

12. The strainer arrangement of claim 1 wherein a hydraulic device is in operative engagement with the axially movable shaft to move the axially movable shaft.

13. The strainer arrangement of claim 1 wherein an extension shaft is coupled to an upper-most part of the axially movable shaft, the extension shaft has trapezoidal threads that are engagable with a worm-gear driving mechanism.

14. The strainer arrangement of claim 1 wherein the axially movable shaft has a seal surrounding the axially movable shaft at an upper end of the strainer pipe.

15. The strainer arrangement of claim 1 wherein the strainer pipe includes a strainer plate on a tank wall.

* * * * *